United States Patent [19]

Hafele et al.

[11] 4,221,195

[45] Sep. 9, 1980

[54] LIQUID COOLED DIESEL ENGINE HAVING GAS COOLED PRECHAMBER

[75] Inventors: Joseph C. Hafele; John C. McCornack, both of Peoria, Ill.

[73] Assignee: Caterpillar Tractor Co., Peoria, Ill.

[21] Appl. No.: 8,007

[22] Filed: Jan. 31, 1979

[51] Int. Cl.³ .............................................. F02B 3/00
[52] U.S. Cl. ..................................... 123/254; 123/273
[58] Field of Search ................. 123/32 C, 32 D, 32 J, 123/32 JP, 191 S, 191 SP, 41.69, 41.7

[56] References Cited

U.S. PATENT DOCUMENTS

| | | | |
|---|---|---|---|
| 1,912,057 | 5/1933 | Bagnulo | 123/32 C |
| 2,075,911 | 4/1937 | Roth | 123/32 C |
| 2,392,060 | 1/1946 | Osborn | 123/32 C |
| 2,406,446 | 8/1946 | Ware | 123/32 C |
| 2,804,858 | 9/1957 | Schilling | 123/32 C |
| 2,866,445 | 12/1958 | Graves | 123/32 C |
| 2,985,155 | 5/1961 | Hockel | 123/32 C |
| 3,105,470 | 10/1963 | Hockel | 123/32 C |
| 3,168,079 | 2/1965 | Henderson | 123/32 C |

*Primary Examiner*—Charles J. Myhre
*Assistant Examiner*—Raymond A. Nelli
*Attorney, Agent, or Firm*—Wegner, Stellman, McCord, Wiles & Wood

[57] ABSTRACT

A liquid cooled, internal combustion engine operating on the diesel cycle including a combustion chamber (34) and a piston (14). Liquid coolant passages (40) receive liquid coolant from a pump (46) for cooling the engine. A prechamber housing (54) is in fluid communication with the combustion chamber but spaced by an air gap within an opening (50) in the head (24) of the engine. A gaseous coolant is directed via conduits (72,82,86,92) to the opening to cool the prechamber.

11 Claims, 8 Drawing Figures

LIQUID COOLED DIESEL ENGINE HAVING GAS COOLED PRECHAMBER

TECHNICAL FIELD

This invention relates to a diesel engine which is liquid cooled.

BACKGROUND ART

It is well known that diesel engines provided with prechambers have lower hydrocarbon and oxides of nitrogen emission levels than direct injection engines. In prechambered engines, high levels of turbulence in the prechamber and in the main combustion chamber cause excellent mixing of fuel droplets and unconsumed oxygen resulting in low hydrocarbon emissions. At the same time, oxides of nitrogen emissions are low in prechambered diesel engines as well. Typically, within the engine prechamber, there is a greater amount of fuel than that required for stoichiometric combustion which tends to cool the mixture within the prechamber so that combustion at high temperatures conducive to the formation of, for example, nitrous oxide, are avoided. And, as the burning mixture exits the prechamber, it is immediately diluted by the relatively cool compressed air in the main combustion chamber. Consequently, high temperatures do not exist in either the main or prechamber, which high temperatures would tend to cause the formation of oxides of nitrogen.

Conversely, a prechambered diesel engine has a higher surface to volume ratio than a direct injection engine and, when liquid cooled, there is a commensurate increase in heat rejection to the liquid coolant. Moreover, because of the greater turbulence in the combustion volume in a prechambered engine, the heat transfer coefficient is increased which results in additional heat rejection over and above that which would occur in a direct injection engine.

As a consequence, to dissipate the large amount of heat rejected to the liquid coolant, relatively larger radiators are required for prechambered engines than for direct injection engines. This of course contributes to the cost of the engine.

Moreover, because prechambers in liquid cooled diesels are also liquid cooled, they do not warm up to operating temperature as rapidly as might be desired making start-up difficult and prolonging the time of warm-up.

Prior art depicting the foregoing structure and/or of possible relevance to the invention hereinafter described and claimed include the following, all U.S. Pat. Nos.: 2,406,446 issued Aug. 27, 1946 to Ware; 2,866,445 issued Dec. 30, 1958 to Graves; 2,985,155 issued May 23, 1961 to Hockel; 3,105,470 issued Oct. 1, 1963 to Hockel et al; and 3,168,079 issued Feb. 2, 1965 to Henderson.

DISCLOSURE OF INVENTION

According to one aspect of the present invention, there is provided an internal combustion engine operating on the diesel cycle which includes a housing defining an operating chamber receiving a piston. The housing is provided with liquid coolant passages in proximity to the operating chamber and means are provided for circulating a liquid coolant through the passages. There is an opening in the housing in fluid communication with the operating chamber and which receives a housing defining a prechamber. The prechamber housing includes a gas outlet adapted to be in fluid communication with the operating chamber and a fuel injector receiving passage and an intermediate prechamber. The prechamber housing is received in the opening in spaced relation to the housing defining the operating chamber so as to be out of direct heat transfer contact therewith and means are provided for moving a gas through the space between the prechamber housing and the engine housing.

The technical problem of minimizing hydrocarbon and oxide of nitrogen emissions while lowering heat rejection to a liquid coolant and improving start-up and warm-up characteristics of liquid cooled diesel engines is solved by the invention. Because the engine is prechambered, low emissions associated with prechambered engines are maintained. Because the prechamber is not liquid cooled, it does not appreciably contribute to heat rejection to the liquid coolant so that the engine provides coolant heat rejection characteristics like those of direct injection diesel engines. At the same time, because the prechamber is not liquid cooled, it warms up rapidly thereby improving start-up and warm-up characteristics.

BEST MODE FOR CARRYING OUT THE INVENTION

Figure 1:
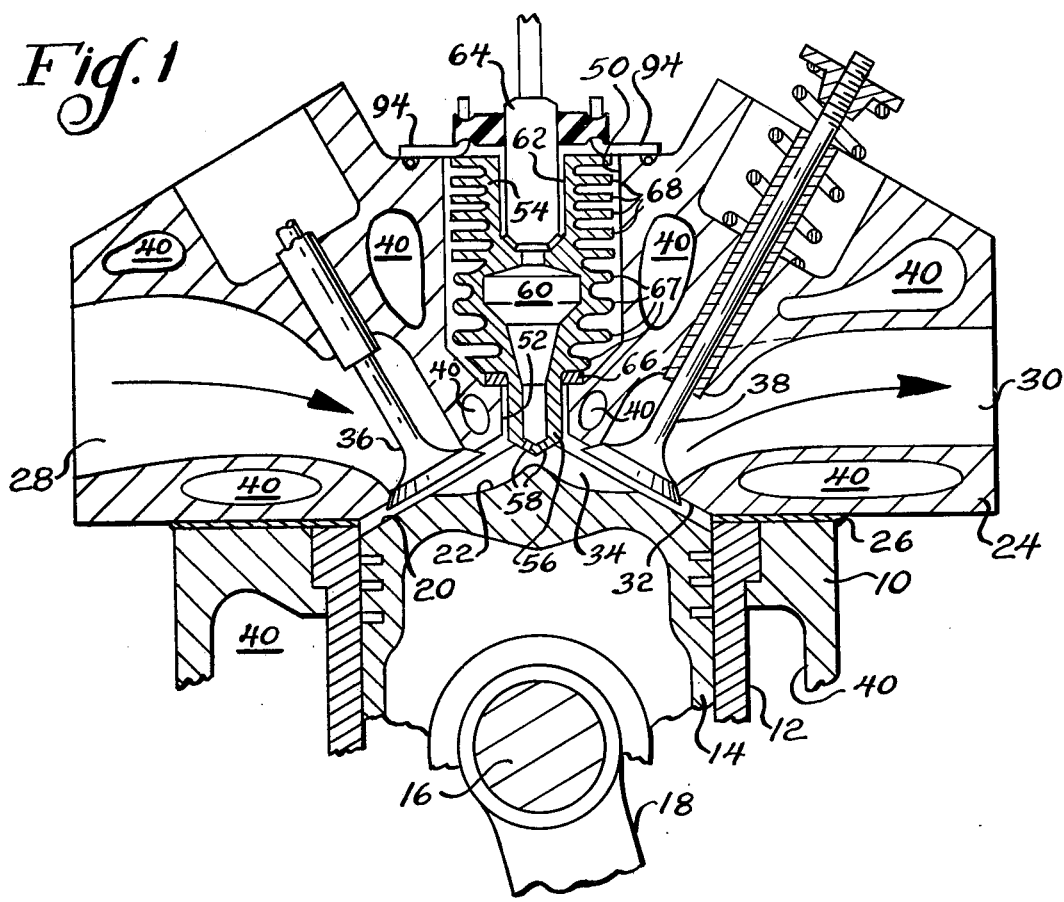
FIG. 1 is a fragmentary, sectional view of an embodiment of an internal combustion engine made according to the invention.

An exemplary embodiment of a diesel cycle, internal combustion engine made according to the invention is illustrated in the drawing in the form of a reciprocating engine. However, it is to be expressly understood that the invention is not limited to reciprocating engines but may be used with equal facility in rotary engines operating on the diesel cycle.

With reference to FIG. 1, the engine includes a block 10 mounting a cylinder liner 12 in a conventional fashion. Within the interior of the liner 12, a piston 14 is reciprocally received and is connected by a wrist pin 16 to a connecting rod 18. The connecting rod is, in turn, connected to the engine main shaft in a conventional fashion.

The piston 14 has a domed crown 20 provided with suitable craters 22. The domed crown 20, of course, maximizes the compression ratio attainable so that the engine may operate on the diesel cycle while the craters 22 provide their conventional function of optimizing the intermingling of fuel droplets and unconsumed oxygen to maximize the efficiency of the combustion process.

A head 24 closes the cylinder defined by the liner 12 and is secured to the block 10 by any suitable means. A gasket 26 is interposed between the head 24 and the block 10.

The head 24 includes an intake port 28 and an exhaust port 30 for the cylinder. Each of the ports 28 and 30 will typically be connected to a suitable manifold.

The head 24 includes a generally conical recess 32 which is aligned with the open end of the liner 12 so that the two define a main combustion chamber 34 adjacent to crown of the piston 20. The ports 28 and 30 are in fluid communication with the combustion chamber 34 on opposite sides of its apex as seen in FIG. 1 and are respectively closable by valves 36 and 38, the valve 36 being an intake valve and the valve 38 being an exhaust valve. Because the ports 28 and 30 connect to the combustion chamber 34 in the conical recess 32, the valves 36 and 38 are canted away from the longitudinal axis of the liner 12 and displaced to either side of that axis as easily seen in FIG. 1.

As will be appreciated by those skilled in the art, the valves 36 and 38 are opened and closed in appropriate sequence by the engine cam shaft in a manner well known.

Both the block 10 and the head 24 are provided with a plurality of coolant passages 40 in proximity to the combustion chamber 34 as well as to other parts of the engine requiring cooling. As shown schematically in FIGS. 3–7 inclusive, the coolant passages 40 have an outlet 42 connected to a radiator 44 which cools the liquid coolant received from the passages 40. A pump 46 receives cooled liquid coolant from the radiator 44 and, via a conduit 48, returns the same to the passages 40. The pump 46 is, of course, engine driven.

The head 24 is provided with an opening 50 which extends completely through the head 24. Adjacent to conical recess 34, the opening 50 has a narrowed portion 52.

A prechamber housing 54 is disposed within the opening 50 and includes a narrowed end 56 provided with a plurality of outlets 58 in fluid communication with the main combustion chamber 34 and which serve as gas outlets.

Interiorly of the housing 54, there is a prechamber 60 and oppositely of the openings 58, the housing 54 includes a passage 62 which receives a fuel injector 64 of conventional construction. It will be observed that the passage 62 is accessable from the side of the head 24 opposite from the block 10 for servicing purposes.

The prechamber housing 54 is seated within the opening 50 on a relatively thick gasket 66 formed of a material having low thermal conductivity and capable of withstanding high temperatures. The gasket 66 serves to prevent the flow of combustion gases from the main combustion chamber 34 outwardly through the opening 50 as well as to thermally isolate the prechamber housing 54 from the head 24 where the interface of the two is sealed.

In the embodiment illustrated in FIG. 1, it will be seen that all parts of the exterior of the prechamber housing 54 are spaced by an air gap from the head 24 so as to be out of direct thermally conducting contact therewith.

In addition, in the embodiment illustrated in FIG. 1, the entire exterior of the prechamber housing 54 in the vicinity of the prechamber 60 and the fuel injector receiving passage 62 is externally finned. In particular, relatively widely spaced fins 67 are on the exterior of the housing 54 in the vicinity of the prechamber 60 while relatively narrowly spaced fins 68 are on the exterior of the housing 54 in the vicinity of the fuel injector 64.

Means are provided for directing a gaseous coolant to the space between the head 24 and the prechamber housing 54 above the gasket 66.

Figure 4:
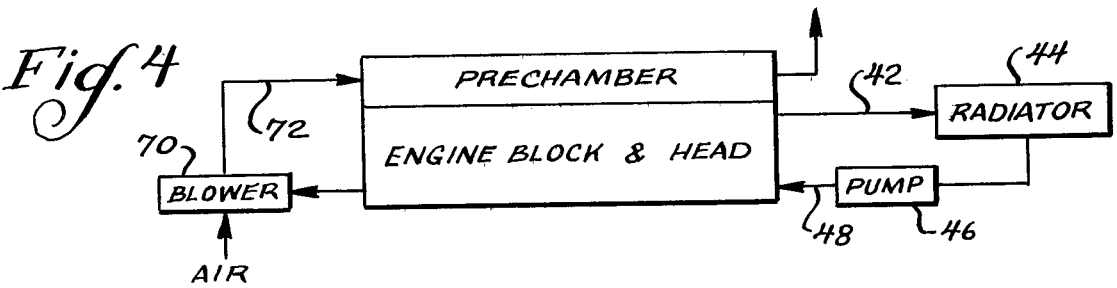
FIGS. 4-8, inclusive, depict schematically, various embodiments by which a cooling gas may be directed to the prechamber.

Various such means are shown in FIGS. 4–7 inclusive. With reference to FIG. 4, there is provided a blower 70 which may be electrically driven or driven by the engine main shaft to direct cooling air through a conduit 72 suitably attached to the space.

Figure 5:
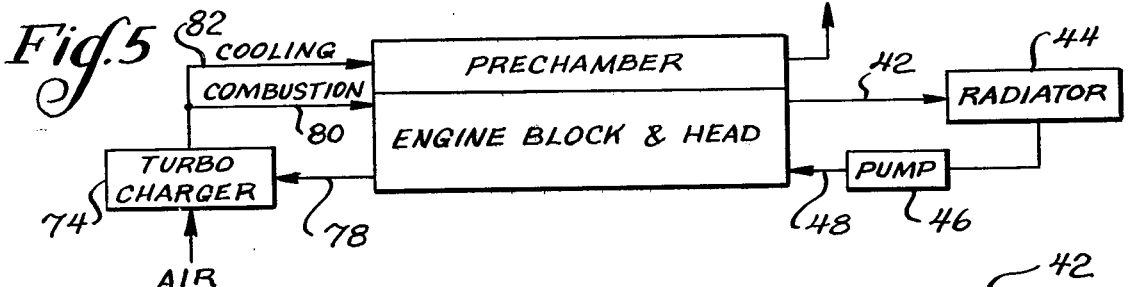

An alternate means is illustrated in FIG. 5. In the case of the embodiment illustrated in FIG. 5, the same includes a conventional turbocharger 74 which is driven by exhaust gases conveyed to a conduit 78 from the exhaust port or ports 30. Most of the air under pressure emanating from the turbocharger is directed by a conduit 80 to the intake 28 in a conventional fashion but a conduit 82 is also connected to the outlet of the turbocharger 74 for directing pressurized air therefrom to the opening 50 to cool the housing 54.

Figure 6:
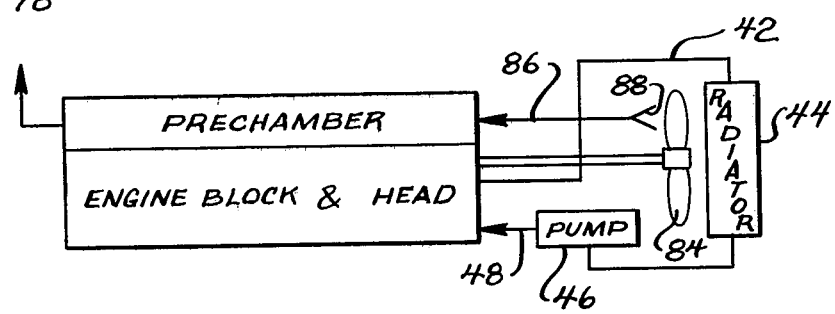

Still another means is illustrated in FIG. 6 wherein the engine drives a fan 84 which is operative to direct a stream of cooling air through the radiator 44. A conduit 86 extends to the opening 50 and includes an inlet 88 in the air stream generated by the fan 84. Consequently, the fan 84 directs air through the inlet 88 and the conduit 86 to the opening 50 to cool the housing 54.

Figure 7:
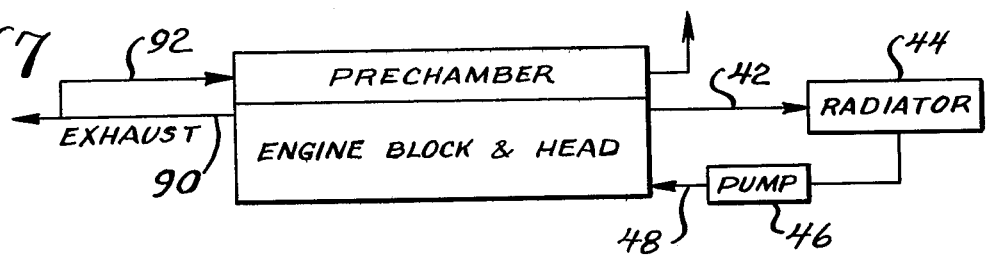

FIG. 7 illustrates still another means by which the housing 54 can be cooled. Specifically, a conduit 90 connected to the exhaust port or ports 30 receives exhaust gases and, via a conduit 92, directs such exhaust gases to the opening 50, again for cooling purposes.

Returning to FIG. 1, the upper end of the opening 50 is closed by suitable cowling 94 so that the cooling gas will be directed about the housing 54. When the engine includes plural operating chambers, some or all of which are in line as, for example, the aligned cylinders in one bank of the engine, the opening 50 may be in the form of an elongated trough as shown schematically at 100 in FIG. 3. The cooling air may be directed into the trough at one end of the bank and flow the length thereof being maintained in the trough by the cowling 94. The trough 100 may be constant width or varying width as desired. Of course, other air flow patterns may be utilized as required.

As is well known, in many cases, there is a practical maximum temperature to which a fuel injector, such as that shown at 64, can be subjected to. It is for this reason that the narrowly spaced fins 68 are employed in the vicinity of the fuel injector. The greater area for heat transfer provided by the greater number of fins due to their narrower spacing provides for increased cooling in the vicinity of the fuel injector 64 so that it will not be subjected to an unduly high temperature. Conversely, the wide spacing between the fins 67 in the vicinity of the prechamber 60 results in a lesser heat transfer area thereat allowing the prechamber 60 to attain a desired operating temperature.

Figure 2:
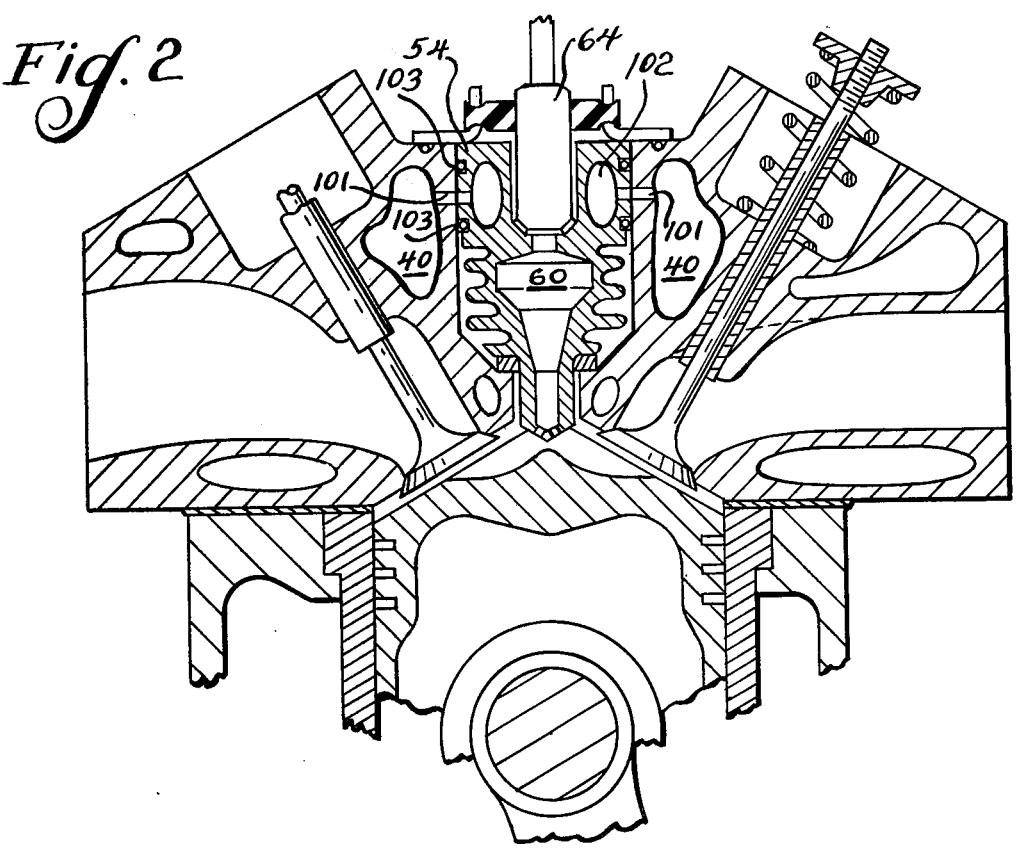
FIG. 2 is a view similar to FIG. 1 but of a modified embodiment of the invention.
Figure 3:
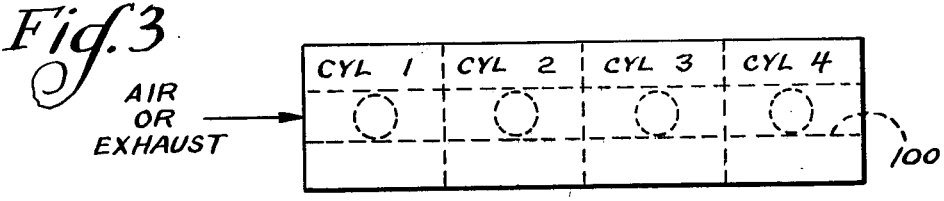
FIG. 3 is a somewhat schematic plan view of a multiple operating chamber engine.

In some instances, the use of narrowly spaced fins in the vicinity of the fuel injector 64 may not be sufficient to adequately cool the same. Accordingly, the invention contemplates a modified embodiment as illustrated in FIG. 2. The embodiment illustrated in FIG. 2 is in all respects identical to that shown in FIG. 1 with the exception that the external fins 68 in the vicinity of the fuel injector 64 are omitted and the prechamber housing 54 is provided with cooling passages 102 connected in fluid communication to engine coolant passages 40 by coolant passages 101, whereby engine coolant may be conducted in proximity to the fuel injector 64 to provide a greater degree of cooling than can be provided by gas cooling alone.

As further shown in FIG. 2, in this modified embodiment, the housing 54 closely fits the head 24 in the vicinity of fuel injector 64. Grooves and seals 103 are located in the outer surface of the housing 54 and sealingly engage the inner surface of the head 24 to prevent the leakage of coolant to either the air gap located between the head 24 and the finned area of housing 54 or the outer surface of the head 24.

Figure 8:
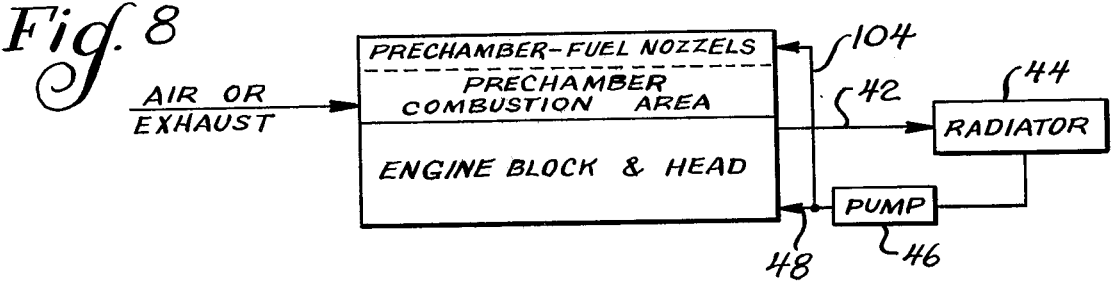

As illustrated schematically in FIG. 8, engine coolant supplied to the engine block 10 and head 24 by the pump 46 via the conduit 48 will also be supplied by the passages 101 to prechamber passages 102 and subsequently returned to the engine block 10 and head 24 by the passages 101.

INDUSTRIAL APPLICABILITY

An internal combustion engine made according to the invention may be advantageously employed wherever liquid cooled, diesel cycle engines are conventionally used and wherein it is necessary to minimize undesirable emissions and/or maximize efficiency of start-up and warm-up. When the engine is running, minimal emissions will be present by reason of the fact that the engine is prechambered. At the same time, smaller radiators than heretofore used on liquid cooled prechambered engines may be employed in that there is no heat rejection from the prechamber to the liquid coolant in the case of the embodiment illustrated in FIG. 1 and minimal heat rejection to the liquid coolant in the case of the embodiment illustrated in FIG. 2.

At the same time, start-up and warm-up characteristics are enhanced in that the thermal capacity of the gaseous coolant used to cool the prechamber is considerably less than that of typical liquid coolants so that the prechamber, upon start-up of the engine, will achieve the desired operating temperature at a much faster rate. And, in the case of the embodiment illustrated in FIG. 7, the start-up and warm-up characteristics will be even more greatly enhanced in that relatively hot exhaust gas will, during start-up and warm-up, actually heat the prechamber rapidly towards its desired operating temperature and yet, thereafter serve to cool the same to maintain it at its desired operating temperature.

While the invention has been described in connection with diesel cycle engines where prechambering is relatively common, it may also be used with efficacy in other liquid cooled prechambered engines, as spark ignition engines, where fuel is introduced into a prechamber either by an injector or through an intake valve within the prechamber.

Other aspects, objects and advantages of this invention can be obtained from a study of the drawings, the disclosure and the appended claims.

What is claimed is:

1. An internal combustion engine comprising:
   a first and second (10,24) housings defining an operating chamber (34);
   a piston (14) movable within said operating chamber;
   liquid coolant passages (40) within said first and second housing in proximity to said operating chamber;
   means (46) for circulating a liquid coolant through said passages;
   an opening (50,52) in said first housing extending to said operating chamber to be in fluid communication therewith;
   a third housing (54) defining a prechamber (60) having a gas exit port (58) and a fuel receiving port (62), said third housing being disposed within said opening such that said gas exit port is in fluid communication with said operating chamber, said third housing being externally finned (67,68) at least in the vicinity of said first housing; and
   means (72,82,86,92) for directing a gaseous coolant to said opening to cool said third housing.

2. The internal combustion engine of claim 1 wherein said fuel receiving port is adapted to receive a fuel injector and said third housing is also externally finned (68) in the vicinity of said fuel receiving port, the spacing of the fins in the vicinity of said prechamber being greater than at said fuel receiving port.

3. The internal combustion engine of claim 1 wherein said fuel receiving port is adapted to receive a fuel injector and further including an additional liquid coolant passage (102) in said third housing and in the vicinity of said fuel receiving port and in fluid communication with said circulating means.

4. An internal combustion engine comprising:
   a first and second housings (10,24) defining an operating chamber (34);
   a piston (14) movable within said operating chamber;
   liquid coolant passages (40) within said first and second housing in proximity to said operating chamber;
   means (46) for circulating a liquid coolant through said passages;
   an opening (50,52) in said first housing extending to said operating chamber to be in fluid communication therewith;
   a third housing (54) defining a prechamber (60) having a gas exit port (58) and a fuel receiving port (62), said third housing being disposed within said opening such that said gas exit port is in fluid communication with said operating chamber but is otherwise generally spaced from said first housing to be substantially out of direct heat transfer contact therewith; and
   means (72,82,86,92) for directing a gaseous media to said opening and between said first and second housings.

5. The internal combustion engine of claim 4 wherein said directing means comprises a blower (70).

6. The internal combustion engine of claim 4 wherein said engine includes an exhaust system (90) and said directing means comprises a conduit (92) connected to said exhaust system.

7. The internal combustion engine of claim 4 wherein said engine includes an air intake system (80), an exhaust system (78), and a turbocharger (74) driven by said exhaust system having an outlet for providing air under pressure to said air intake system; and said directing means comprises a conduit (82) connected to said outlet.

8. The internal combustion engine of claim 4 including a radiator (44) connected to said circulating means and a fan (84) for moving an air stream through said radiator, said directing means including a conduit (86) having an opening (88) in said air stream.

9. The internal combustions engine of claim 4 wherein said first and second housings define a plurality of in line operating chambers (FIG. 3), each provided with one of said pistons and said openings, said openings being aligned and defining an elongated trough (100) in said first housing serving as a gas passage, each said opening including one of said third housings.

10. An internal combustion, reciprocating engine comprising:

an engine block (10) having at least one cylinder (12) therein;

a piston (14) mounted for reciprocation in said cylinder;

a head (24) secured to said block and closing said cylinder to define a combustion chamber (34);

an opening (50,52) in said head in nominal alignment with the center of said cylinder;

liquid coolant passages (40) in said head and said block in proximity to said combustion chamber;

a pump (46) for circulating liquid coolant through said passages;

a pair of valves (36,38) mounted for reciprocation in said head for movement into and out of said combustion chamber, said valves being oppositely canted with respect to the axis of said cylinder and disposed on opposite sides of said openings;

gas ports (28,30) in said head and closeable by said valves;

a housing (54) having an internal prechamber (60), a gas outlet (58) in fluid communication with said prechamber and an oppositely located fuel injector receiving passage (62), said housing being disposed in said opening such that said gas outlet is in fluid communication with said combustion chamber and said fuel injector receiving passage is accessible from the side of said head opposite said block, a substantial part (56,67,68) of the periphery of said housing within said opening being separated from said head by a space; and means (72,82,86,92) for directing a gas through said space.

11. The internal combustion engine of claim 10 wherein said substantial part is externally finned (67,68).

* * * * *